US004001728B2

United States Statutory Invention Registration [19]

[11] Reg. Number: H1728

[45] Published: May 5, 1998

Kelso et al.

[54] SIMULATOR

[75] Inventors: Thomas M. Kelso, Great Mills; David T. Perdue; Gary L. Pratz, both of California; Damon J. Boyle, Leonardtown; Scott R. Davis, Hollywood; Douglas M. Vojik, California, all of Md.

[73] Assignee: The United States of America as represented by the Secretary of the Navy, Washington, D.C.

[21] Appl. No.: 339,991

[22] Filed: Oct. 28, 1994

[51] Int. Cl.[6] ..... G09B 9/42

[52] U.S. Cl. ..... 434/43; 434/30; 434/35; 434/38

[58] Field of Search ..... 434/29, 30, 33–35, 434/38, 43, 69; 364/134

[56] References Cited

U.S. PATENT DOCUMENTS

| | | | |
|---|---|---|---|
| 4,856,771 | 8/1989 | Nelson et al. | 434/43 X |
| 5,224,861 | 7/1993 | Glass et al. | 434/30 X |
| 5,286,202 | 2/1994 | de Gyarfas et al. | 434/29 X |

OTHER PUBLICATIONS

*Red Baron* Control Documentation: pp. C1–C18 no date.
Ellison et al. 1990. *PC–Computing* 3 (Dec.) 284.

*Primary Examiner*—Michael J. Carone
*Attorney, Agent, or Firm*—Susan E. Verona; Ron Billi

[57] ABSTRACT

A flight simulator displays control choices on an out-the-window display and allows a crew member to control it directly by making selections of displayed choices through a "point and click" control module accessible by the crew member while located in the crew station. The simulator can be controlled by either of two crew members and also by an operator at an instructor operator station outside the crew station.

11 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SIMULATOR

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates to simulators, and more particularly to improvements in a manned flight simulator of the kind used in the training of aircraft pilots and other flight crew members.

A typical flight simulator, for example the aircrew procedures trainer for the "W" model Cobra attack helicopter, comprises a crew station in the form of an enclosure the interior of which resembles a portion of the interior of the aircraft, an "out-the-window" (OTW) display in the form of a projection screen located forward of the crew station, and an instructor operator station (IOS), all typically located along with associated mechanical and electronic equipment in a room which can be darkened to enhance the visibility and effectiveness of the OTW display. In some cases, the IOS is located in a separate room.

The OTW display presents to the aircrew a visual representation of the virtual world in which the simulator is operating. The OTW display is computer-generated, and provides the aircrew with a view of what it would see through the windows of a real flying aircraft.

The IOS is typically located adjacent to the crew-station, and enables an instructor to control a simulation session. It normally includes several terminals and several computers running software to control the simulation and to display important data.

From the IOS, the instructor or operator can set the aircraft's location and other initial conditions, aircraft parameters, environmental conditions, weapons inventories and stores, and can enter data causing simulations of various aircraft systems failures to occur, either randomly or upon command. The IOS software can also be used to log the number of hours each member of the aircrew flies in the simulator, and keep track of the mission scenarios experienced by each aircrew member. It can also be used to ensure that the aircrew follows proper procedures.

One of the problems with a conventional simulator of the type described is that the IOS utilizes a "command line" interface, requiring the operator to enter commands through a keyboard. The operator must be thoroughly familiar with a large number of commands and must be able to enter them accurately and with proper syntax. In some instances, the operator must enter several commands to perform a single task. Because of the command line interface, a high degree of operator training is required.

A related problem is that the running of a simulation typically requires a number of computers, often of different types and utilizing different operating systems. The computers read the states of cockpit controls and other aircraft hardware. Therefore, the operator must have a thorough knowledge of the computers and their operating systems, and must know the effects that the computers and hardware have on one another. The high degree of complexity of a typical simulator results in the practical necessity that an operator be trained to run a specific simulator.

Another significant problem results from the fact that the IOS, while adjacent to the crew station, is not immediately accessible to the aircrew. Even if the necessity for the constant attention of an instructor or other operator could be eliminated, a crew member wishing to make a change during a simulation session would need to leave the crew station to go to the IOS, enter the necessary changes in an IOS terminal, and return to the crew station. This would break the continuity of the simulation session. Furthermore, depending on the type of aircraft being simulated, it may be difficult for the crew member to get out of and into the crew station, especially when the room is darkened.

SUMMARY OF THE INVENTION

The improved simulator in accordance with this invention addresses the aforementioned problems by displaying control choices on the same video display means which displays mission condition-simulating scenes, at the same location thereon at which at least portions of the mission condition-simulating scenes are displayed, and by permitting direct selection of displayed choices by a crew member through a control module accessible by the crew member while located in the crew station.

In a preferred embodiment of the invention, the control module is located immediately outside the crew station at a location such that it is easily reachable by a crew member. Preferably the control module includes a trackball which is used to move a pointer on the video display into conjunction with displayed choices which can be selected by clicking a button adjacent to the trackball. A request button is provided on the control module to enable the crew member to call up the display of choices on the video display and to take over control of the simulator.

In one embodiment, the crew station accommodates two or more crew members, e.g. a pilot and a gunner, each of whom has immediate access to a control module. An operator at the IOS also has the ability to control the simulation. Any one of these three individuals can take over control of the simulator. Switching is provided so that no two persons can simultaneously enter selections from the displayed choices.

The improved simulator in accordance with the invention provides for simple "point and click" control by a crew member, and neither the control module nor the device displaying control choices intrudes into the crew station.

Accordingly, the principal object of this invention is to provide an improved simulator which can be operated in a practical manner by a crew member without the need for the constant attention of an instructor or operator at the IOS.

It is also an object of the invention to provide a simulator which can be operated by aircrew members with minimal training. Still a further object is to eliminate the necessity for aircrew members to climb into and out of the crew station to control the simulation. It is also an object of the invention to avoid having simulator controls intrude into the interior of the simulator crew station, and thereby avoid causing crew members to become accustomed to non-flight hardware in the crew station.

Other objects, advantages and novel features of the invention will become apparent from the following detailed description of the invention, when considered in conjunction with the accompanying drawings.

DESCRIPTION OF THE PREFERRED EMBODIMENTS

Figure 1:
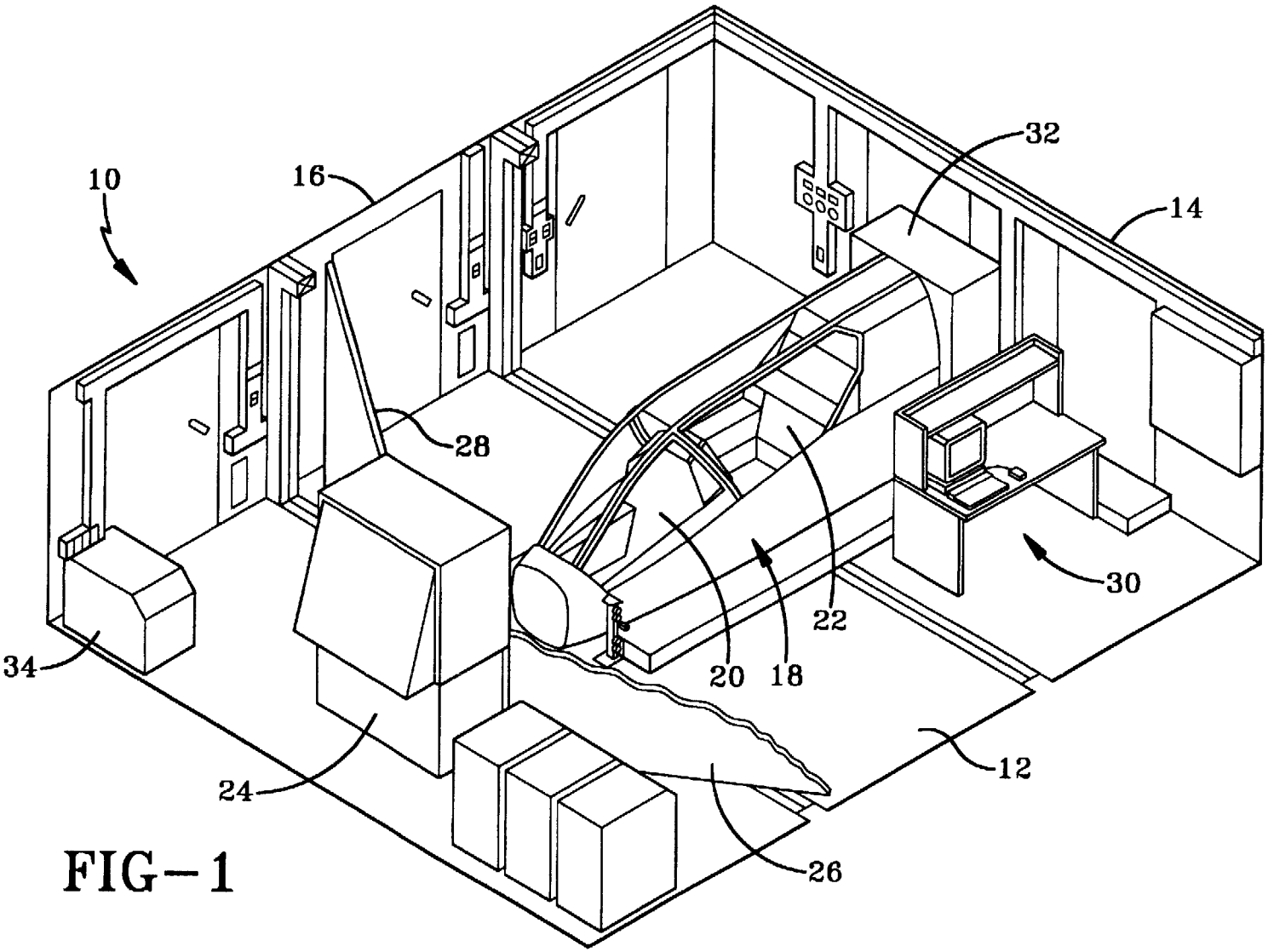
FIG. 1 is a partially broken away, schematic, perspective view of a simulator in accordance with the invention, showing the crew station, the OTW display and the IOS, along with various other simulator components in a room.

FIG. 1 shows a simulator room 10 having a floor 12, a rear wall 14 and a side wall 16, the other side walls and ceiling being omitted to reveal the various simulator components, including a crew station 18. The crew station in FIG. 1 is in the form of the cockpit of a "W" model Cobra attack helicopter, and has a front seat 20 for a gunner or copilot, and a rear sea 22 for the pilot. The crew station has side walls extending upwardly from the bottom of the crew station to an intermediate location. Above the side walls, the crew station is partly open to permit entry and exit by the crew members, and to allow the crew members access to their control modules, which, as discussed later, are mounted outside the crew station.

In front of the crew station is a large screen, high resolution, rear projection display monitor 24, used to show the center channel of the out-the-window (OTW) display. A suitable monitor is the Barco RETROGRAPHICS display, available from Barco Projection Systems, Inc. of 1000 Cobb Place Blvd., Kennesaw, Ga. 30144. A video switcher (not separately shown) is used to switch a selected one of multiple input signals for display. A suitable video switcher is the Barco Remote Control Video Display Switcher (RCVDS) 800 video switcher, also available from Barco Projection Systems, Inc.

The left and right portions of the out-the-window display are projected onto front projection screens 26 and 28, located respectively to the left and right of monitor 24. An instructor operator station (IOS) 30 is provided at the left rear of the crew station 18.

To the rear of crew station 18, there is an enclosure 32 containing various simulator system components, including microcomputers which run the simulation control software, control module switching relays, a video distribution amplifier, and various interface cards.

The microcomputers are two Vaxstation 4000 Model 90 microcomputers. The entire simulation and its control software are run on these two microcomputers.

The switching relays are used to connect the control modules to the microcomputers, by selecting one, and only one, of the control modules as an input device at any given time.

The video distribution amplifier splits a video signal into two identical output signals and amplifies both output signals. It is used for routing video signals generated by the microcomputers to the display monitor 24. These signals cause the various choices available to the crew members and to the operator at IOS 30 to be displayed simultaneously on monitor 24 and on a monitor at the IOS. A suitable distribution amplifier is model ADA 2 220 HV, available from Extron Electronics, Inc. of 13554 Larwin Circle, Santa Fe Springs, Calif. 90670.

At a separate location in the room, an image generator 34 is provided. The image generator is a separate computer which generates a representation of the virtual world in which the simulated aircraft is flying. Its interface with the control computers in enclosure 32 is through a standard ETHERNET connection. A suitable image generator is an Evans and Sutherland image generator 2000, available from Evans and Sutherland, Inc. of 600 Komas Drive, P.O. Box 58700, Salt Lake City, Utah 84158.

Figure 2B:
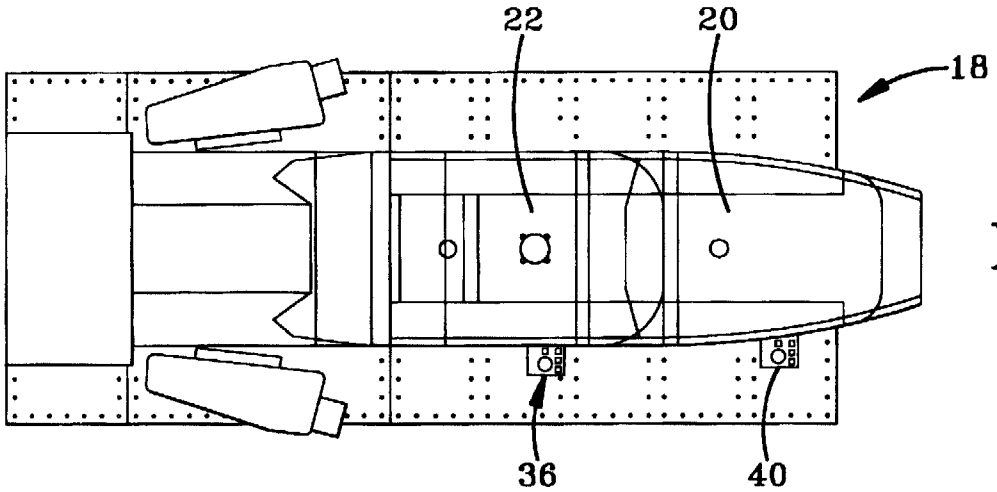
FIG. 2B is a top plan view of the crew station of FIG. 2A.
Figure 2C:
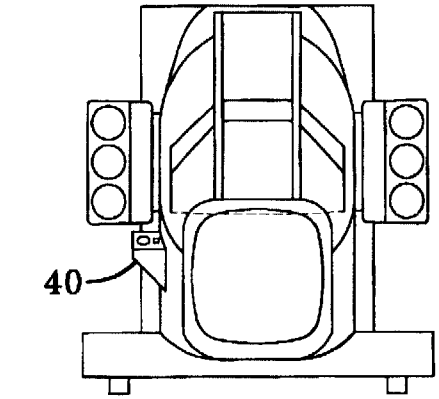
FIG. 2C is a front elevation of the crew station of FIGS. 2A and 2B.
Figure 2A:
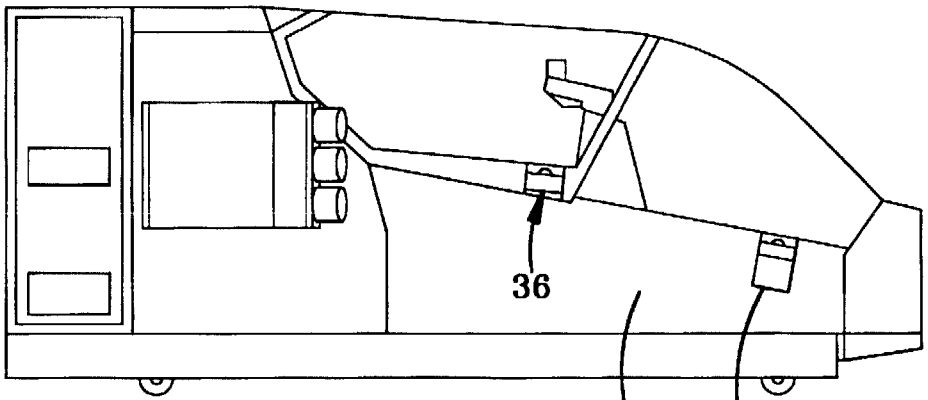
FIG. 2A is a side elevation of a two seat crew station showing the locations of the control modules.

The control modules are mounted on the exterior of the crew station 18, as shown in FIGS. 2A–2C. Control module 36 is the pilot's control module, mounted by a bracket on the outside face of the right side wall 38 of the crew station adjacent to the pilot's seat 22. Control module 40, which is substantially identical to control module 36, is the gunner's control module, mounted by a bracket on the outside face of the right side wall 38 of the crew station adjacent to the gunner's seat 20, and near the top edge of the side wall. These control modules are accessible respectively to the pilot and gunner, who can easily reach and operate them through the window openings to their right.

Each of these control modules comprises a trackball and a set of momentary contact push buttons. As shown in FIGS. 6A–6D, the pilot's control module 36 comprises a bracket 42 for mounting to the side wall of the crew station, and a top plate 44 in which is mounted a conventional trackball assembly 46, including a ball 48, which is manually rotatable by the pilot. The trackballs are available from Evergreen Systems International of 31336 Via Colinas, Westlake Village Calif. 91362. Also mounted on the top plate 44 are four momentary, lighted, push-button switches 50, 52, 54 and 56.

Switch 50 is a "click" button corresponding to the conventional click button associated with a laptop computer trackball. It is positioned to the left of the trackball and is operable by the thumb of the pilot's right hand, while the fingers or palm are in contact with the upper part of the ball. Switch 50 is used to enter the selection of a choice displayed on the screen of monitor 24. When a pointer controlled by the trackball is in conjunction with a particular displayed choice, the choice can be selected by momentary depression of switch 50.

Switch 52 is a "freeze" button, used to halt the simulation temporarily.

Switch 54 is a "reset" button, used to reset the simulation in the event of a simulated crash.

Switch 56 is a control request switch used to initiate a video switching sequence by which the scene displayed on monitor 24 is replaced by the control screen displaying choices selectable by switch 50. Switch 56 also causes control of the computers to be taken over by control module 36.

Switches 52, 54 and 56 are preferably mounted forward of the trackball 48 so that they can be operated by the pilot's fingers.

Figure 3:
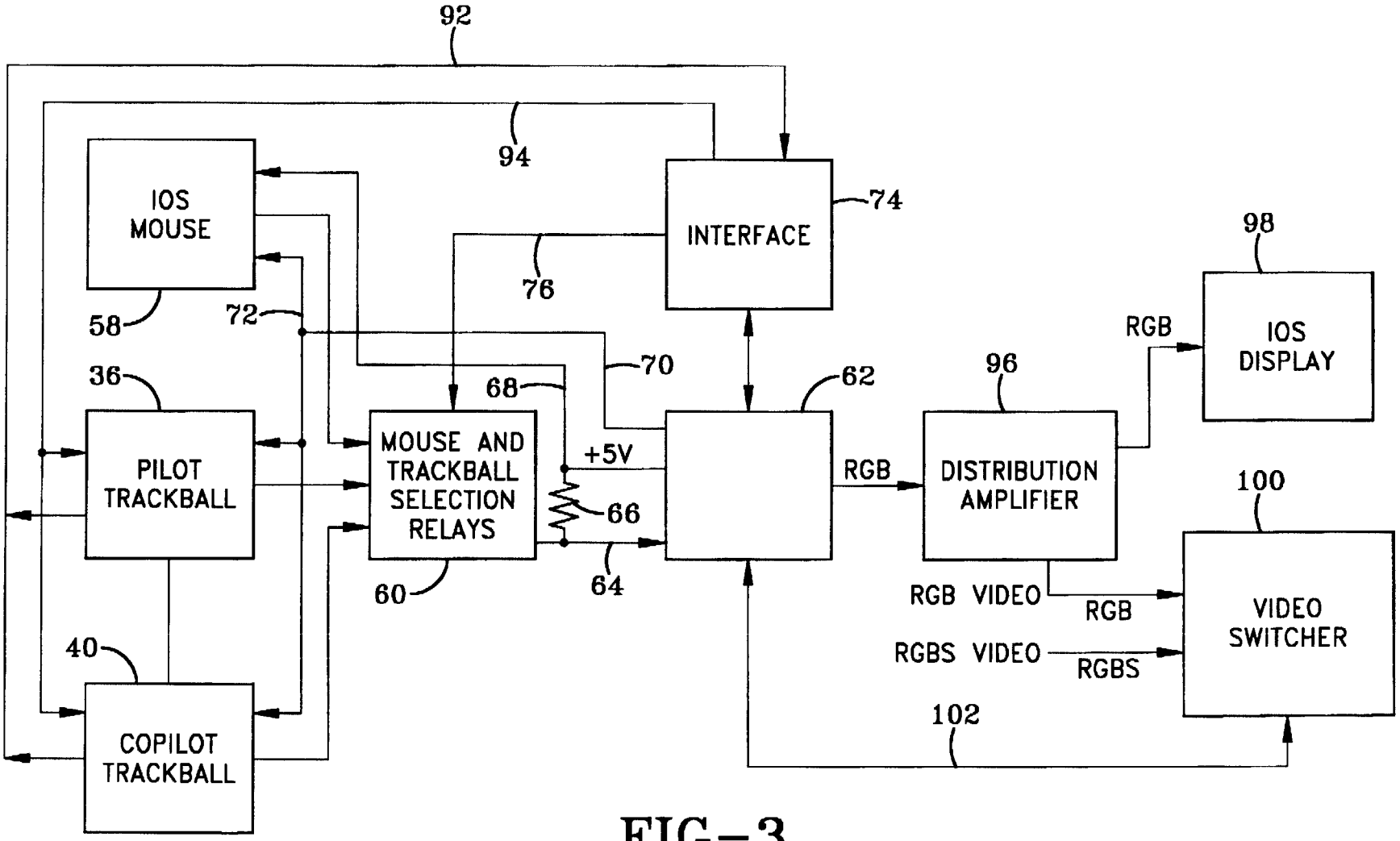
FIG. 3 is a schematic block diagram of the simulator control system.

As shown in FIG. 3, the trackball outputs from the pilot's control module 36 and the gunner's control module 40, along with the output of a "mouse" control module 58 (located at the IOS 30 in FIG. 1) are connected respectively through a set of selection relays 60 to microcomputers 62 (in enclosure 32 shown in FIG. 1) through a microcomputers' receive line 64. When none of the control modules is selected, the receive line 64 is held at a positive 5 volts, through resistor 66, connected to a positive supply line 68. Feedback signals are transmitted from the microcomputers to the three control modules, and ground connections are made from the microcomputer to the control modules, through unswitched connections represented by lines 70 and 72.

The selection relays 60 are controlled through a set of interface cards 74 through a control connection 76. Nearly all of the electrical components, including switches, relays, circuit breakers, instruments, gauges, etc. are wired into these interface cards, and through them, the microcomputers 62 are able to sense when any of the various switches or other components has been activated.

Figure 4:
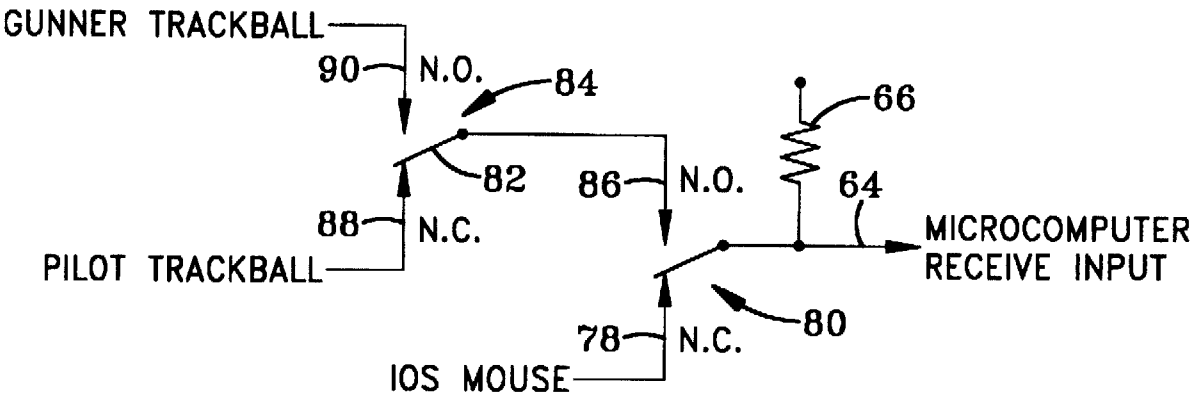
FIG. 4 is a schematic diagram of the selection switching for effecting exclusive control of the simulator by one or the other of two crew members or by an operator.

Referring to FIG. 4, in which multiple relay contacts are represented by single relay contacts, the output of the IOS mouse is connected to microcomputer receive line 64 through normally closed contacts 78 of relay 80. The movable contacts 82 of relay 84 is connected to the normally open contacts 86 of relay 80. The pilot's trackball is connected to the normally closed contacts 88 of relay 84, and the gunner's trackball is connected to the normally open contacts 90 of relay 84. With the relay circuit wired as shown in FIG. 4 only one of the three input devices, i.e. the IOS mouse and the pilot's and gunner's trackballs, can have its output connected to the microcomputer receive line 64 at any given time.

The freeze, reset and request push-button switches, 52, 54 and 56, of the pilot's control module, and the corresponding switches of the gunner's control module are interconnected with interface cards 74 through connections 92 and 94. These connections are also used to return indicator signals to the control modules, which may be used to cause the illumination of the push-buttons to change color or to change to a higher level of brilliance when the push-buttons are activated.

In the operation of the system depicted in FIG. 3, the activation of a request push-button switch on one of the control modules, i.e. switch 56 on the pilot's control module or the corresponding switch on the gunner's control module, sends a signal to the interface cards 74 which causes the selection relays to switch control of the computer to the trackball associated with the selected push-button. For example, activation of the pilot's request switch causes relay 80 (FIG. 4) to operate, thereby switching the pilot's trackball to the mnicrocomputers' receive line 64. If the gunner's request switch is activated, both relays 80 and 84 are activated, and the gunner's trackball is switched to the microcomputers' receive line.

Figure 5:
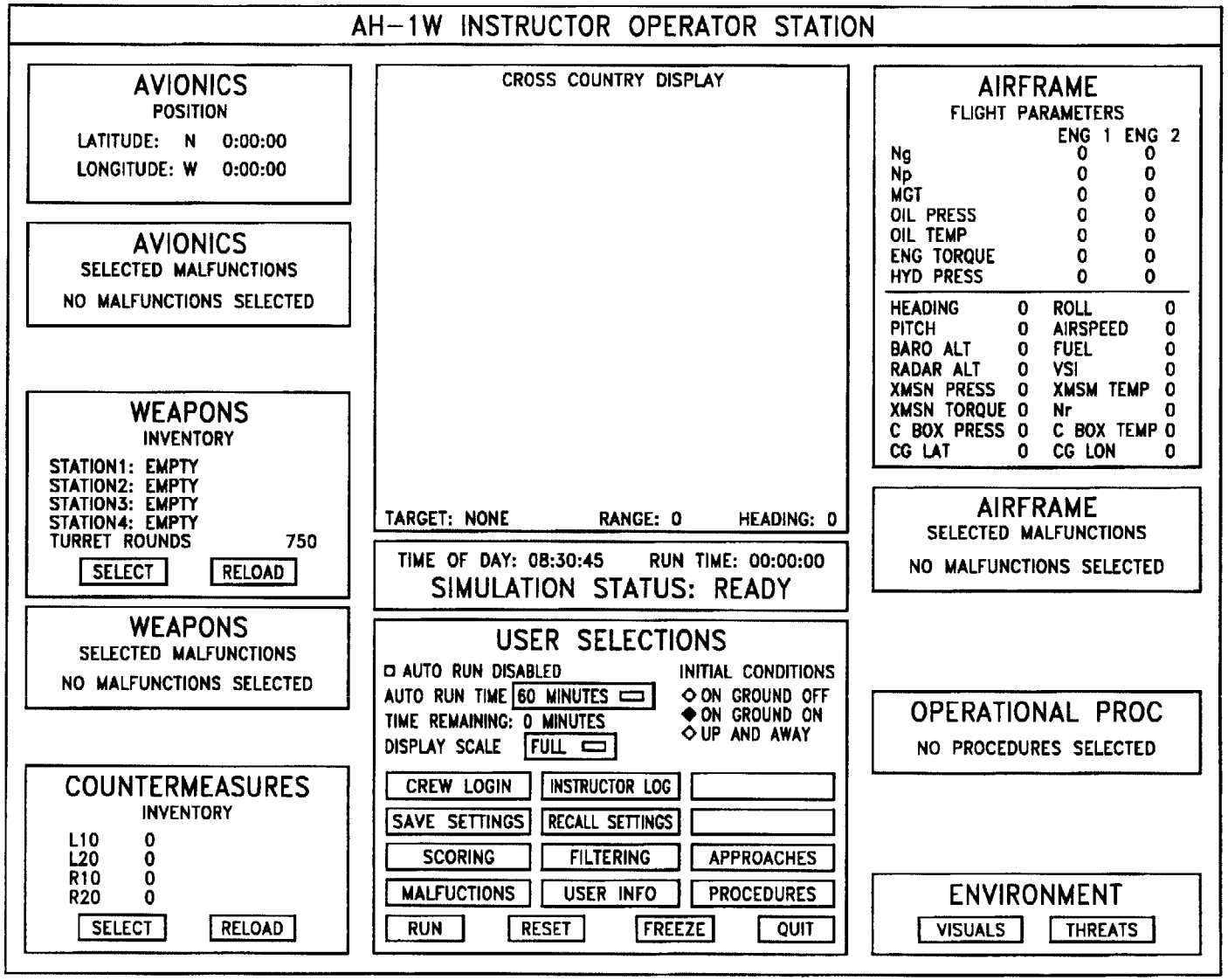
FIG. 5 is an elevational view of a typical screen display of control choices, as seen by an operator on an IOS monitor, and also by the crew members on the OTW display.
Figure 6A:
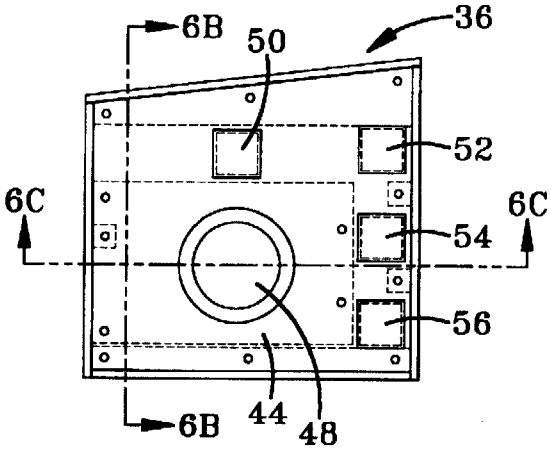
FIG. 6A is a top plan view of a crew member's trackball control module.
Figure 6B:
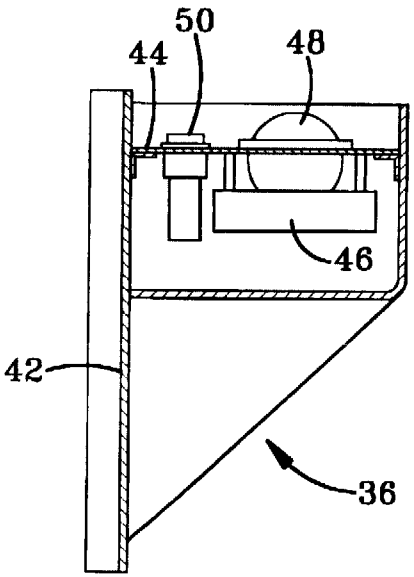
FIG. 6B is a sectional view taken on plane B—B of FIG. 6.
Figure 6C:
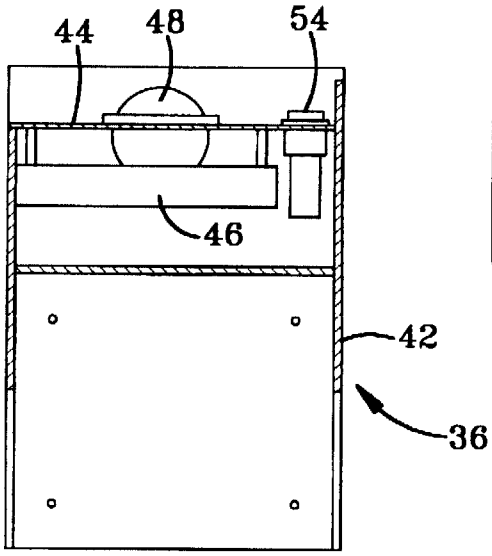
FIG. 6C is a sectional view taken on plane C—C of FIG. 6.
Figure 6D:
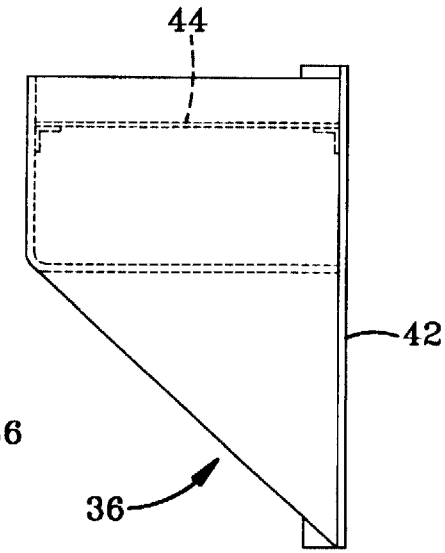
FIG. 6D is an elevational view of the control module as seen from the right side of FIG. 6A.

The RGB video output generated by microcomputers 62 is a control screen as depicted in FIG. 5. This video output is distributed by distribution amplifier 96 to an IOS monitor 98 at instructor operator station 30 (FIG. 1), and to the video switcher 100. The video switcher also receives RGBS video from the image generator 34 (FIG. 1) and is controlled directly by microcomputers 62 through control connection 102. When the pilot's or gunner's request switch is operated, a signal is transmitted over connection 102 which causes the video switcher 100 to interrupt the display of the simulation on monitor 24, and to substitute the software-generated control screen shown in FIG. 5, wherein selections are displayed at different locations on the screen. Preferably, the generation of the simulation is also interrupted at the same time.

A selection may be entered by moving a computer-generated pointer over the screen by manipulation of the pilot's or gunner's trackball and clicking the corresponding click button. Software can be used to generate one or more subsidiary levels of selections for some or all of the selections displayed on the screen. Thus, the display can be used to enter numerous selections to effect the desired control of the simulator.

With the simulator in accordance with this invention, a pilot or gunner can enter the simulator room, power up the simulator at the IOS, and, while at the IOS, configure the simulation session as desired, using, a keyboard and/or mouse at the IOS. When the simulator is running, the pilot or gunner leaves the IOS and climbs into the crew station to fly the scenario as planned. The pilot or gunner does not have to leave his or her seat in the simulator until the training session has been completed. If, during the training session, a simulated crash is experienced, the pilot or gunner simply selects the reset button on the control module. To change flight conditions or parameters, the pilot or gunner selects the request button to display the control screen on the OTW display and use the trackball and click button to make the appropriate changes to the simulation.

The principal advantage of this invention is that it allows the simulation to be controlled from the crew station, and eliminates the need for the continuous attention of a dedicated operator at the IOS. Another advantage is that, even in the absence of an operator at the IOS, the pilot and gunner do not need to leave their seats in the crew station during the simulation session to control the simulation. The point and click format of the control software, replaces the command line format, makes the simulator easy to use, and makes it practical to control the simulator from the crew station. The combination of features provides a simulator which is substantially easier to use than prior simulators, and can be used efficiently by a single pilot or gunner, with minimal training in simulator operation. The system can be constructed from commercially available hardware.

Various modifications can be made to the simulator described above. For example, while the invention has been described in the context of an attack helicopter simulation, it can be adapted to various other types of military and non-military aircraft simulators as well as simulators for tanks and other weapons systems. The trackballs in the control modules can be replaced by joysticks, touch-sensitive buttons and other manually controllable devices for screen pointer control.

Many other modifications and variations of the invention are possible in view of the above disclosure. It is therefore to be understood that, within the scope of the appended claims, the invention may be practiced other than as specifically described.

We claim:

1. In a simulator comprising a crew station comprising a cockpit having seating for at least one crew member, the cockpit having side walls and a window, video display means for displaying images, the images being located outside the crew station but visible therefrom, image generating means for driving said display means to produce scenes simulating mission conditions on said display means, and control means for controlling the operation of said image generating means, the improvement wherein said control means includes:

means for displaying control choices on said video display means at the same location thereon at which at least portions of said mission condition-simulating scenes are displayed; and a control module located outside the cockpit, adjacent to one of the side walls, and reachable by the crew member through the window while seated in the cockpit, said control module including means by which said crew member can make selections from the displayed choices and thereby affect operation of said image generating means.

2. A simulator according to claim 1 in which said means for displaying control choices displays said choices at predetermined locations on said video display means and also displays a pointer on said video display means, and in which said control module includes means for moving said pointer to conjunction with any selected one of said predetermined locations, and means for entering a selection of a particular one of said displayed choices while the pointer is in conjunction with said one choice.

3. A simulator according to claim 1 in which said means for displaying control choices displays said choices at predetermined locations on said video display means and also displays a pointer on said video display means, and in which said control module includes means, comprising a trackball, for moving said pointer to conjunction with any selected one of said predetermined locations, and means for entering a selection of a particular one of said displayed choices while the pointer is in conjunction with said one choice.

4. A simulator according to claim 1 in which said means for displaying control choices displays said choices at predetermined locations on said video display means and also displays a pointer on said video display means, and in which said control module includes means for moving said pointer to conjunction with any selected one of said predetermined locations, and means, comprising a click button, for entering a selection of a particular one of said displayed choices while the pointer is in conjunction with said one choice.

5. A simulator according to claim 1 in which said means for displaying control choices displays said choices at predetermined locations on said video display means and also displays a pointer on said video display means, and in which said control module includes means, comprising a trackball, for moving said pointer to conjunction with any selected one of said predetermined locations, and means, comprising a click button, for entering a selection of a particular one of said displayed choices while the pointer is in conjunction with said one choice.

6. A simulator according to claim 1 including switching means for causing said video display means to display alternatively said scenes simulating mission conditions and said control choices.

7. A simulator according to claim 1 including switching means, controllable by a crew member through said control module, for causing said video display means to display alternatively said scenes simulating mission conditions and said control choices.

8. A simulator according to claim 1 including switching means, controllable by a crew member through said control module, for causing said video display means to display alternatively said scenes simulating mission conditions and said control choices, said switching means enabling the crew member to interrupt the display of scenes simulating mission conditions to call up said control choices on said video display means.

9. A simulator according to claim 1 including an instructor operator station located outside the crew station and inaccessible to said crew member while the crew member is located in the crew station, means for displaying said control choices to an operator at the instructor operator station, and a second control module at the instructor operator station, accessible by an operator while located in the instructor operator station, said second control module including means by which said operator can make selections from the displayed control choices and thereby affect operation of said image generating means.

10. A simulator according to claim 9 including switching means for causing said video display means to display alternatively said scenes simulating mission conditions and said control choices, said switching means enabling the crew member and the operator to interrupt the display of scenes simulating mission conditions, in which said control module comprises means, manually operable by the crew member, for operating said switching means, and said instructor operator station includes means, manually operable by the operator for operating said switching means.

11. A simulator according to claim 10 in which said switching means includes means for preventing said crew member and operator from simultaneously making selections from said control choices.

* * * * *